(12) United States Patent
Baeckler (10) Patent No.: US 10,162,919 B1
(45) Date of Patent: Dec. 25, 2018

(54) METHOD AND APPARATUS FOR IMPROVING A DESIGN FOR A SYSTEM DURING COMPILATION BY PERFORMING NETWORK REPLACEMENT

(71) Applicant: Altera Corporation, San Jose, CA (US)

(72) Inventor: Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 154 days.

(21) Appl. No.: 15/159,066

(22) Filed: May 19, 2016

(51) Int. Cl.
*G06F 17/50* (2006.01)

(52) U.S. Cl.
CPC ...... *G06F 17/5045* (2013.01); *G06F 17/5054* (2013.01); *G06F 2217/64* (2013.01)

(58) Field of Classification Search
CPC .............. G06F 17/505; G06F 17/5059; G06F 17/5072; G06F 2217/14

USPC .......................... 716/101–104, 107, 131–135
See application file for complete search history.

(56) References Cited

U.S. PATENT DOCUMENTS

| | | | | |
|---|---|---|---|---|
| 6,427,226 B1* | 7/2002 | Mallick | ............... | G06F 17/5031 716/113 |
| 6,470,486 B1* | 10/2002 | Knapp | .................. | G06F 17/505 716/105 |
| 7,055,121 B1* | 5/2006 | Bolander | ............... | G06F 17/505 716/113 |
| 8,856,713 B1* | 10/2014 | Padalia | ............... | G06F 17/5054 716/121 |
| 2014/0173538 A1* | 6/2014 | Adavani | ............... | G06F 17/505 716/104 |

\* cited by examiner

*Primary Examiner* — Nghia Doan
(74) *Attorney, Agent, or Firm* — Compass IP Law PC (57) ABSTRACT

A method for designing a system on a target device includes identifying an exclusive-OR (XOR) network in a design for the system that matches an XOR network in a library. The XOR network in the design is replaced with a preferred XOR network in the library.

24 Claims, 10 Drawing Sheets

METHOD AND APPARATUS FOR IMPROVING A DESIGN FOR A SYSTEM DURING COMPILATION BY PERFORMING NETWORK REPLACEMENT

FIELD

Embodiments of the present disclosure relate to tools for designing systems on target devices. More specifically, embodiments of the present disclosure relate to a method and apparatus for improving a design for a system during compilation by performing network replacement.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

Cyclic redundancy check (CRC) circuitry, forward error correction (FEC) encoders/decoders, and scramblers/descramblers are circuits implemented frequently in network and data storage and retrieval systems. These circuits utilize large networks of exclusive-OR (XOR) gates with multiple outputs fed by a pool of inputs with an overlapping pattern. For example, a common CRC-32 first step receives 64 data bits and produces 32 outputs, where each output depends on approximately half of the 64 data bits, in a randomized pattern.

In order to implement these types of circuits on a target device such as a field programmable gate array, the circuits need to be decomposed into look-up tables (LUTs) with 6 or fewer inputs. Current compilation procedures have limited time to improve the quality of a design and perform only minimal factoring of large XOR networks for optimization.

SUMMARY

Embodiments of the present disclosure maintain a library of pairs that include an XOR network and a pre-computed factored version of the XOR network. A design is analyzed to identify un-optimized versions of the network. Identified un-optimized versions of the network that include the XOR network are replaced with pre-computed factored versions of the XOR networks. Replacing the design with the pre-computed factored versions of the XOR networks improves the design by allowing it to be implemented with a smaller amount of area on a target device, fewer resources, and/or to operate at faster speeds.

A method for designing a system on a target device includes identifying an XOR network (pattern) in a design for the system that matches an XOR network in a library. The XOR network in the design is replaced with a preferred XOR network in the library. According to an embodiment of the present disclosure, the preferred XOR network in the library may be implemented with fewer components on the target device, may be implemented with fewer wires on the target device, may require less power to operate, and/or may operate at higher speed than the XOR network in the design.

According to an embodiment of the present disclosure, the XOR network in the design may be identified by performing a conflict check which compares a number of inputs, type of gates, and shared inputs between the XOR network in the design and the XOR network in the library.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
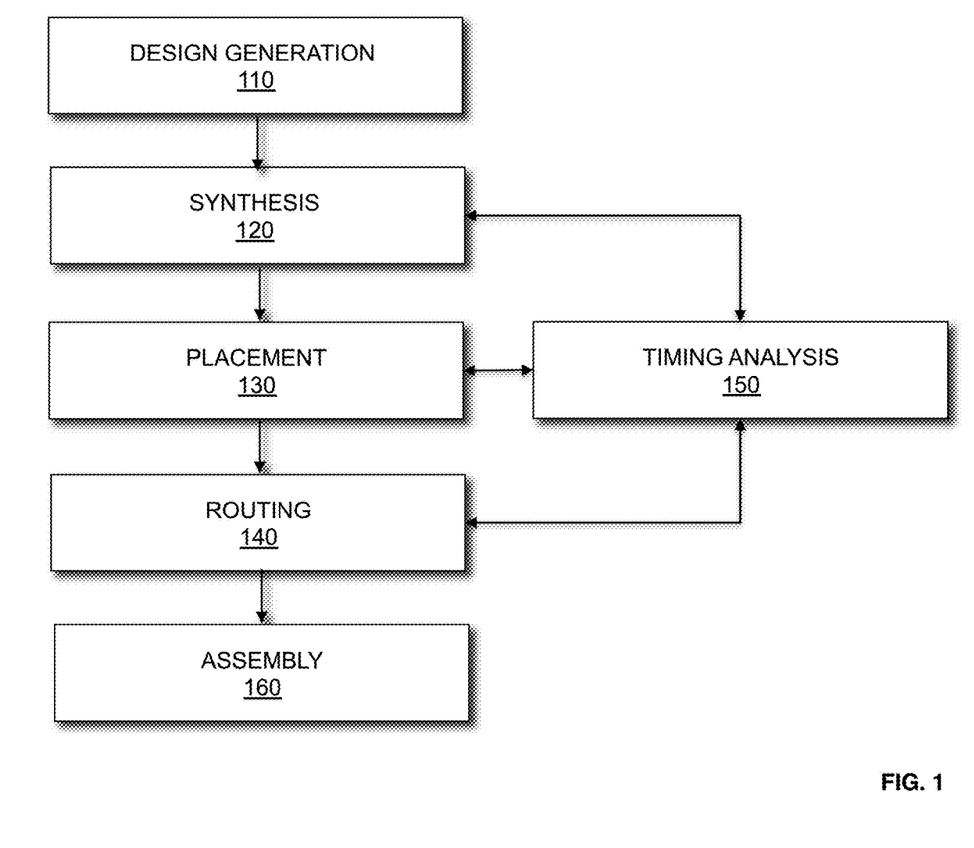
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The procedures described in FIG. 1 may collectively be referred to as "compilation" of a design. The target device may be a field programmable gate array (FPGA), application specific integrated circuit (ASIC), a structured ASIC, or other device whose functionality is described by a hardware description language (HDL). At 110, a design for the system is generated. According to an embodiment of the present disclosure, the design is generated in response to input provided by a user. In this embodiment, the user may input a register-transfer-level (RTL) description of the system, select and connect logic from a design library, or utilize other design input options. The design for the system generated may be in HDL and may include a plurality of reconfigurable logic blocks.

At 120, the system is synthesized and a netlist is generated. Synthesis includes generating a logic design of the system to be implemented by the target device. According to an embodiment of the present disclosure, synthesis generates an optimized logical representation of the system from an HDL design definition. During synthesis, identification and replacement may be performed where a network is identified from a netlist and replaced with a preferred network that is equivalent, but has a preferred configuration. A network may be preferred for a variety of different reasons. According to an embodiment of the present disclosure, a network may be preferred if it may be implemented with fewer components on the target device, may be implemented with fewer wires on the target device, may require less power to operate, and/or may operate at higher speed than the original network in the design.

A plurality of preferred networks may be generated prior to synthesis and stored in a library to be used as a replacement when a matching network is identified. The identified network may include a plurality of inputs and outputs. According to an embodiment of the present disclosure, the identified network may be an XOR network.

At 130, the system is placed. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

At 140, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 150, timing analysis is performed on the system designed. According to an embodiment of the present disclosure, the timing analysis determines whether timing constraints of the system are satisfied. As part of timing analysis, slack analysis may be performed. Timing analysis 150 may model variations on a die such that elements located near each other are modeled having similar delays. In one embodiment, a variation on the die may be modeled as a set of process variables. It should be appreciated that the timing analysis may be performed during and/or after each of the synthesis 120, placement 130, and routing procedures 140 to guide compiler optimizations.

At 160, an assembly procedure is performed. The assembly procedure involves creating a program file that includes information determined by the procedures described at 110, 120, 130, and 140. The program file may be a bit stream that may be used to program a target device. In the case of an ASIC, the program file may represent the physical layout of the circuit. According to an embodiment of the present disclosure, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components (programmable resources) on the target device are physically transformed to implement the system.

Figure 2:
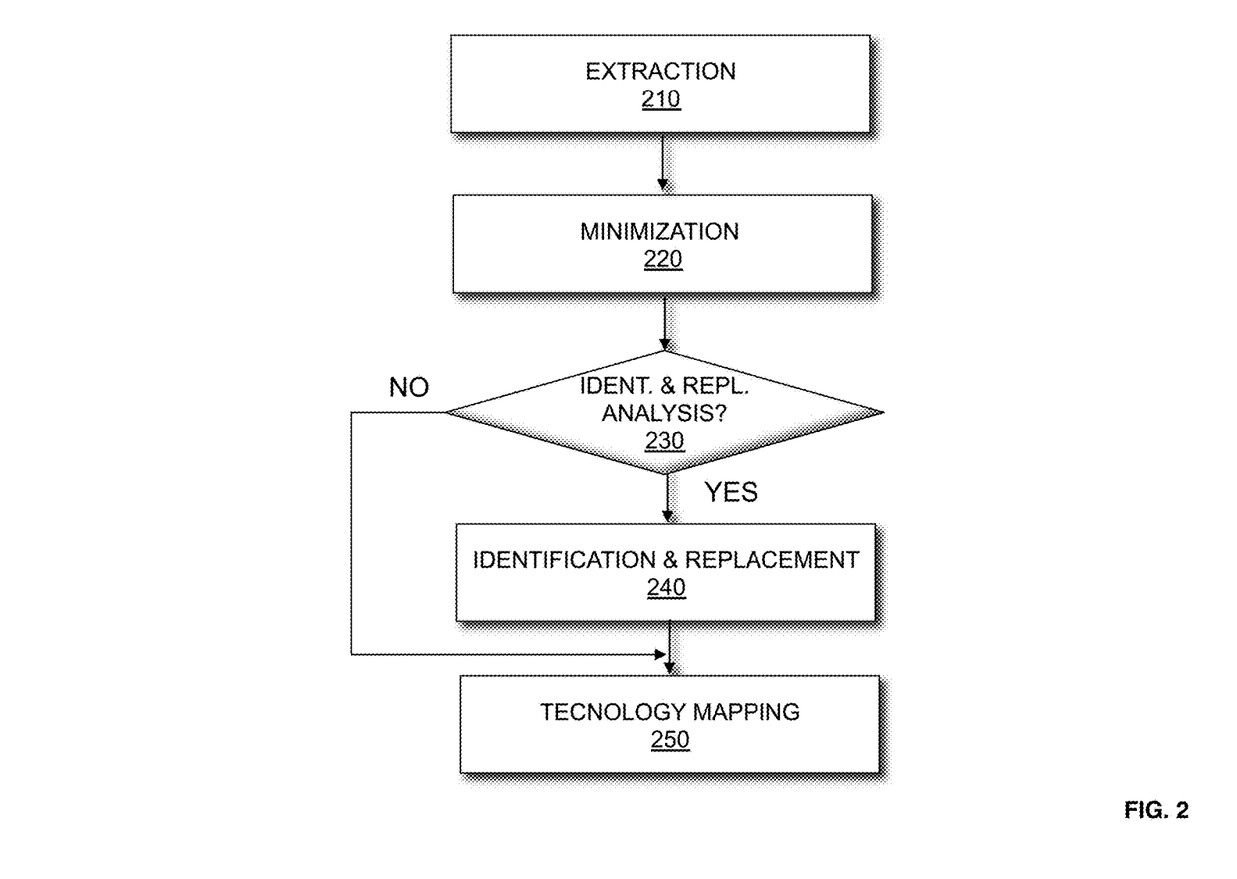
FIG. 2 is a flow chart illustrating a method for performing synthesis according to an exemplary embodiment of the present disclosure.

FIG. 2 is a flow chart illustrating a method for performing synthesis according to an exemplary embodiment of the present disclosure. According to an embodiment of the present disclosure, the method described in FIG. 2 may be used to implement procedure 120 shown on FIG. 1. At 210, extraction is performed. According to an embodiment of the present disclosure, when a design is in the format of text files, extraction generates a netlist from the text files. The netlist may include a description of components in the design.

At 220, minimization is performed. According to an embodiment of the present disclosure, minimization includes performing Boolean optimizations on the netlist to reduce the logic required to implement the design.

At 230 a determination is made as to whether identification and replacement analysis is to be performed on the design for the system. According to an embodiment of the present disclosure, the determination may take into account a number of different components in networks of components within the design for the system. If identification and replacement analysis is to be performed, control proceeds to 240. If identification and replacement analysis is not to be performed, control proceeds to 250. According to an embodiment of the present disclosure, the determination at 230 may be optional and identification and replacement analysis may be performed automatically during synthesis.

At 240, identification and replacement analysis is performed. According to an embodiment of the present disclosure, identification and replacement analysis involves identifying networks in a netlist of a design for a system that match networks in a library. Each network in the library has a corresponding preferred network that can be used to replace the identified network in the netlist of the design. Each preferred network in a network-preferred network pair in the library may be pre-designed and pre-optimized prior to compilation. After a match is identified for a network, the identified network is replaced with the preferred network. According to an embodiment of the present disclosure, each network in the library may have a plurality of preferred networks. In this embodiment, each preferred network may be associated with a different objective or improvement. For example, a first preferred network may be directed to reducing area required for implementing the network, a second preferred network may be directed improving speed of the network, a third preferred network may be directed to still another objective. In response to a preference provided by a user, the identified network in the design for the system may be replace with an appropriate preferred network.

According to an embodiment of the present disclosure, networks in the library include networks of exclusive-OR gates (XOR networks) and corresponding preferred networks include XOR networks that have been factored. The factored XOR networks may reflect canceled inputs. The ability to replace an identified XOR network in a netlist for a design with an equivalent, factored XOR network improves the system without imposing additional compilation time required for performing the factoring.

Figure 3:
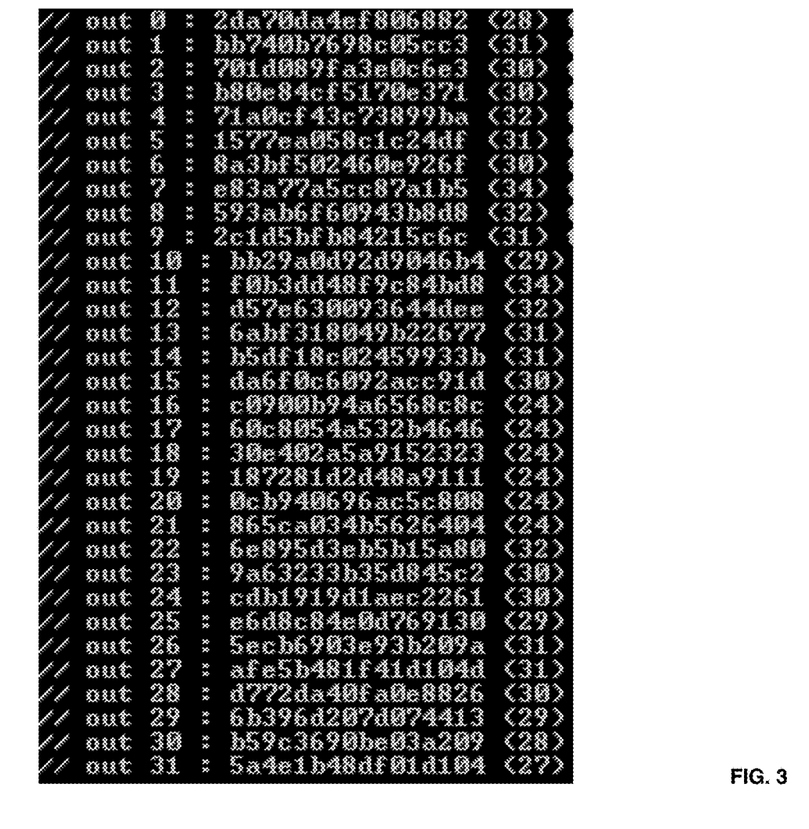
FIG. 3 is an example of an XOR network in a library according to an exemplary embodiment of the present disclosure.

FIG. 3 illustrates an example of an XOR network in a library according to an exemplary embodiment of the present disclosure. In this example, the XOR network has 32 gates and has 32 outputs and 64 inputs. The ones in the mask correspond to an XOR gate using an input.

Referring back to FIG. 2, at 250, technology mapping is performed. According to an embodiment of the present disclosure technology mapping is performed on an optimized logic design. Technology mapping includes determining how to implement logic gates and logic elements in the optimized logic representation with specific resources on the target device such as logic elements and functional blocks. According to an embodiment of the present disclosure, a logic netlist is generated from mapping during synthesis. This netlist may be an optimized technology-mapped netlist generated from the HDL. The logic netlist may identify resources utilized in a target and interconnections between ports of the resources.

Figure 4:
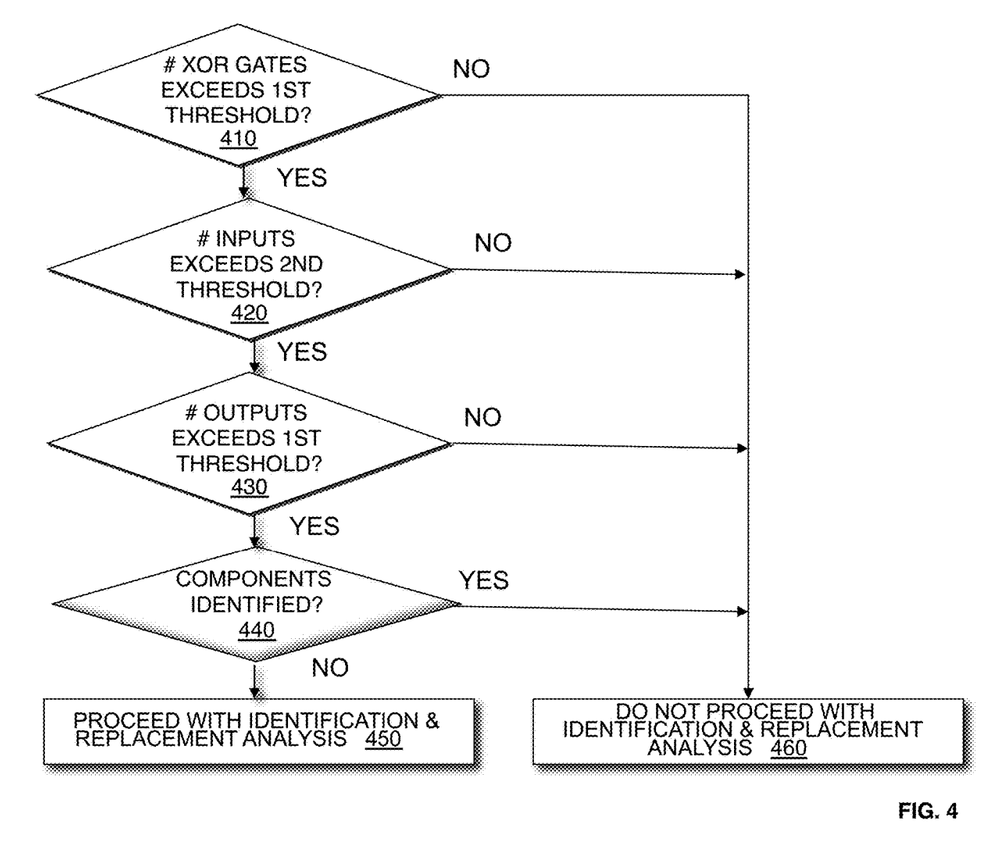
FIG. 4 is a flow chart illustrating a method for determining whether to perform identification and replacement according to an exemplary embodiment of the present disclosure.

FIG. 4 is a flow chart illustrating a method for determining whether to perform identification and replacement according to an exemplary embodiment of the present disclosure. According to an embodiment of the present disclosure, the method described in FIG. 4 may be used to implement procedure 230 shown on FIG. 2 where identification and replacement is used to identify and replace a network which is an XOR network. At 410, it is determined whether the network includes a number of XOR gates that exceeds a first threshold. If it is determined that the network includes a number of XOR gates that exceeds the first threshold number, control proceeds to 420. If it is determined that the network includes a number of XOR gates that does not exceed the first threshold number, control proceeds to 460.

At 420, it is determined whether the network includes a number of inputs that exceed a second threshold number. If it is determined that the network includes a number of inputs that exceeds the second threshold number, control proceeds to 430. If it is determined that the network includes a number of inputs that does not exceed the second threshold number, control proceeds to 460.

At 430, it is determined whether the network includes a number of outputs that exceed the first threshold number. If it is determined that the network includes a number of outputs that exceeds the first threshold number, control proceeds to 440. If it is determined that the network includes a number of inputs that does not exceed the first threshold number, control proceeds to 460. According to an embodiment of the present disclosure, the first threshold number and the second threshold number may be different numbers. According to an alternate embodiment of the present disclosure, the first threshold number and the second threshold number may both be selected to be 32.

At 440, it is determined whether the network includes a component from a list of pre-identified components. According to an embodiment of the present disclosure, the pre-identified components include memories, multipliers, and phase-locked loops. If it is determined that the network does not include a component from the list of pre-identified components, control proceeds to 450. If it is determined that the network includes a component from the list of pre-identified components, control proceeds to 460.

At 450, control proceeds to identification and replacement analysis.

At 460, control does not proceed to identification and replacement analysis.

Figure 5:
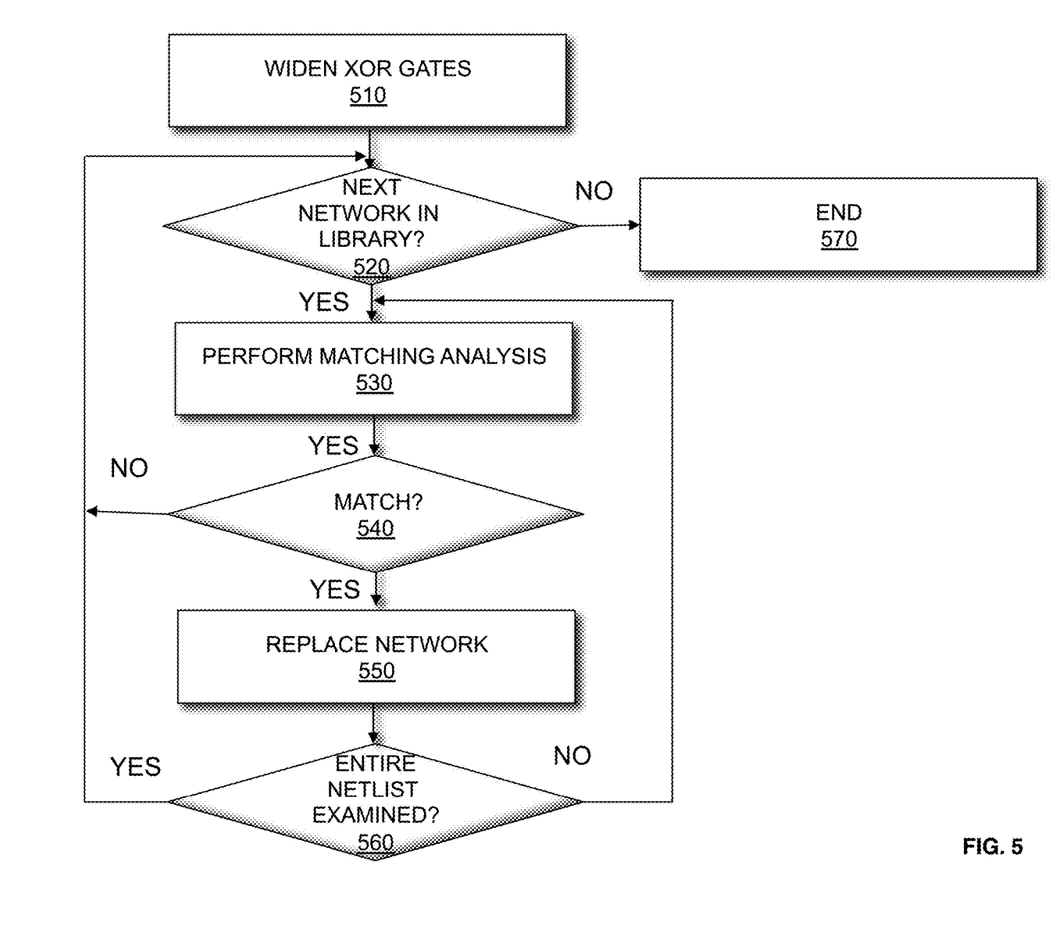
FIG. 5 is a flow chart illustrating a method for performing identification and replacement according to an exemplary embodiment of the present disclosure.

FIG. 5 is a flow chart illustrating a method for performing identification and replacement according to an exemplary embodiment of the present disclosure. According to an embodiment of the present disclosure, the method described in FIG. 5 may be used to implement procedure 240 shown on FIG. 2. At 510, where identification and replacement is performed for XOR networks (patterns), XOR gates in a design for the system are widened. According to an embodiment of the present disclosure, widening of XOR gates in a design is achieved by changing a first configuration of XOR gates which are grouped together in a longer vertical structure, where many XOR gates having a small number of inputs are used, to a second configuration of XOR gates which are grouped together in a shorter vertical structural, where fewer XOR gates having a larger number of inputs are used. According to an embodiment of the present disclosure, the widening of the XOR gates may be achieved optionally through registers.

At 520, it is determined whether a next network (pattern) in the library is available to identify which has not previously been analyzed. If it is determined that a next network in the library is available, control proceeds to 530 to performing matching analysis on the next network. If it is determined that a next network in the library is not available because all networks in the library have already been analyzed, control proceeds to 570.

At 530, a matching analysis is performed on the design for the system to determine whether the current network being analyzed can be found in the design. According to an embodiment of the present disclosure, the mapping analysis includes comparing each gate and shared inputs of each gate in a network in the design with each gate and shared inputs of each gate in the current network being analyzed from the library.

At 540, if it is determined that a match exists between the current network from the library that is being analyzed and a network in the design, control proceeds to 550. If it is determined that a match does not exist between the current network from the library that is being analyzed and the networks in the design, control returns to 520.

At 550, the network in the design identified to match the network from the library is replaced with a preferred network from the library. According to an embodiment of the present disclosure, a notification may be provided to a user that informs the user that a preferred network may be used in place of the network in the design. The notification may include a file that is generated with matching port names and information demonstrating equivalence of the preferred network. In this embodiment, replacing the network in the design with the preferred network may be performed in response to receiving authorization from the user. According to an embodiment of the present disclosure where a plurality of preferred networks are associated with the identified network, an appropriate preferred network may be selected to replace the identified network in response to user input that reflects an objective desired by the user. According to an alternate embodiment of the present disclosure where notification is provided to the user, the user may have the option of directly selecting the preferred network desired to replace the identified network or indirectly selecting the preferred network by providing a desired objective that is achieved by the preferred network.

At 560, it is determined whether the entire design netlist has been examined for networks matching the current network from the library. If the entire design netlist has not been examined, control returns to 530. According to an embodiment of the present disclosure, prior portions of the design which have been previously examined are not re-examined for a network matching the current network from the library. If the entire design netlist has been examined, control returns to 520.

At 570, control terminates the procedure.

Figure 6:
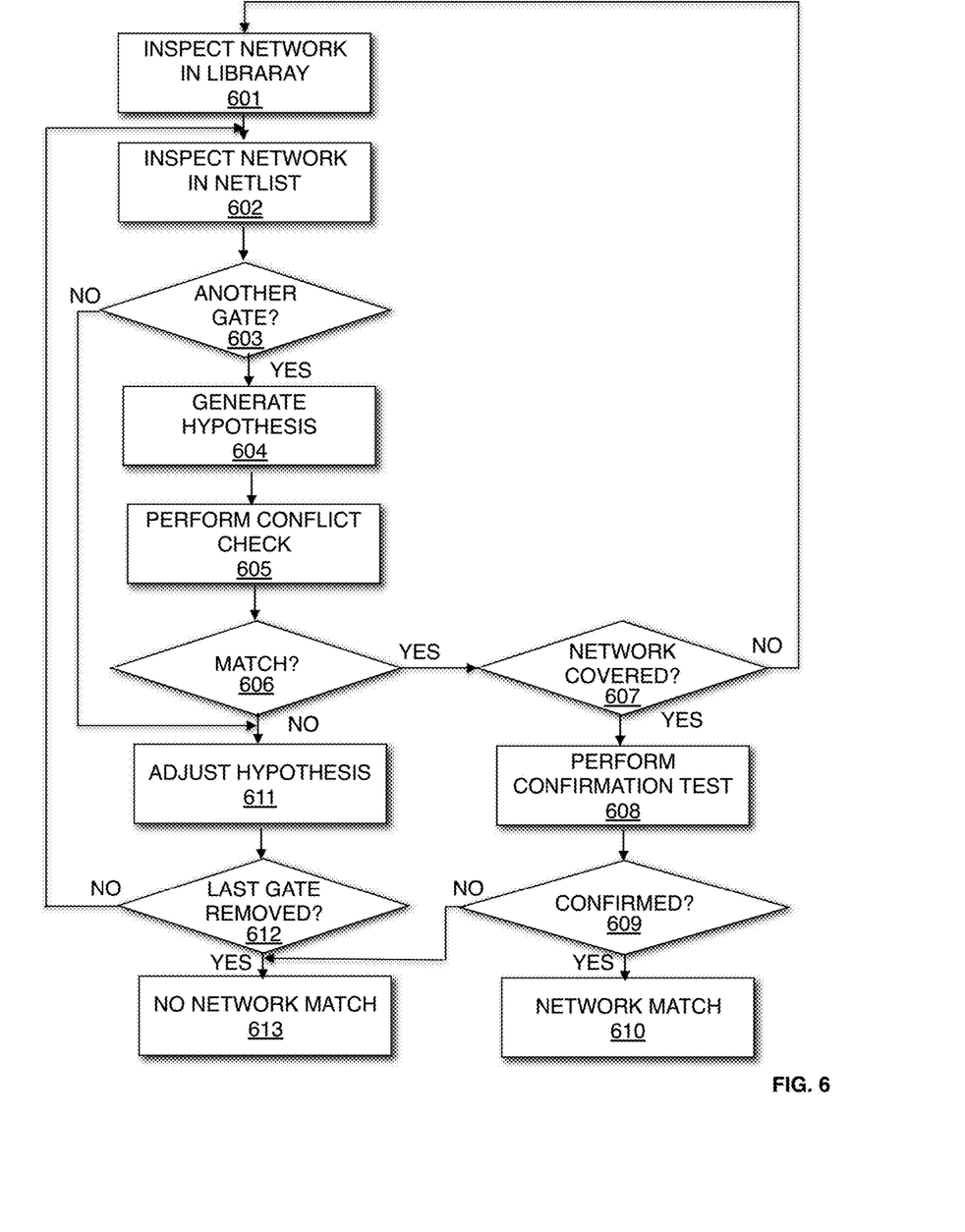
FIG. 6 is a flow chart illustrating a method for performing matching analysis according to an exemplary embodiment of the present disclosure.

FIG. 6 is a flow chart illustrating a method for performing matching analysis according to an exemplary embodiment of the present disclosure. According to an embodiment of the present disclosure, the method described in FIG. 6 may be used to implement procedure 530 shown on FIG. 5. At 601, a network (pattern of components) in the library is inspected. According to an embodiment of the present disclosure, inspecting the network in the library involves identifying a next gate in the network that has not been previously inspected. It should be appreciated that when procedure 601 is performed the first time, a first gate in the network is identified.

At 602, a netlist for a design of a system is inspected. According to an embodiment of present disclosure, inspecting the netlist involves identifying a next gate in the netlist. It should be appreciated that when procedure 602 is performed the first time, a first gate in the netlist is inspected. It should be further appreciated that when procedure 602 is performed after procedure 607, the next gate inspected may be a gate not previously inspected, and that when procedure 602 is performed after procedure 612, the next gate inspected may be a gate that may or may not have been previously inspected.

At 603, it is determined whether another gate exists in the netlist exists from the inspection. If another gate exists in the netlist, control proceeds to 604. If another gate does not exist in the netlist, control proceeds to 611.

At 604, a hypothesis is generated. According to an embodiment of the present disclosure, generating the hypothesis involves proposing that one or more gates that have been inspected from the network of gates in the library is equivalent to one or more gates that have been inspected from the netlist for the design of the system and included in a network from the netlist.

At 605, a conflict check is performed. According to an embodiment of the present disclosure, the conflict check determines whether a match exists between the gates in the network being examined from the library and the gates in the network from the netlist of the design, as proposed by the hypothesis.

At 606, if it is determined that a match exists, control proceeds to 607. If it is determined that a match does not exist, control proceeds to 611.

At 607, it is determined whether the network from the library is covered. According to an embodiment of the present disclosure, the network in the library is covered when all of the gates in the network in the library have been inspected and have a match from the network of gates from the netlist. If it is determined that the network in the library is covered, control proceeds to 608. If it is determined that network in the library is not covered, control returns to 601.

At 608, a confirmation test procedure is performed on the network from the library and the network from the netlist to determine whether the two are a match. According to an embodiment of the present disclosure, the confirmation procedure involves flagging all input signals to gates in the network from the netlist of the design to indicate that they may receive signals originating from any source. For each netlist gate in the hypothesis, an AND operation is performed on all input signals with a corresponding pattern mask from the library. For a correct hypothesis, each input signal in the netlist will be left with a single 1 flag. This indicates the input index of the XOR network fulfilled by this particular netlist input signal. The confirmation procedure is necessary because the procedure up to this point identifies the correct XOR topology, but does not distinguish the specific functional roles of the input signals.

At 609, it is determined whether the network match has been confirmed. If the match has been confirmed, control proceeds to 610. If the match has not been confirmed, control proceeds to 613.

At 610, control recognizes that there is a match between the networks and may replace the network in the netlist of the design with a preferred network associated with the matching network in the library.

At 611, the hypothesis is adjusted. According to an embodiment of the present disclosure, upon determining that the previous hypothesis yields non-matching networks, one or more previous gates in the network from the netlist of the design may be removed from the hypothesis in order for a new hypothesis to be generated.

At 612, it is determined whether a first gate from the network from the netlist of the design has been removed. If the first gate from the network from the netlist of the design has been removed, control proceeds to 613. If the first gate from the network from the netlist of the design has not been removed, control returns to 602. The gates that have been removed may be marked to indicate that they have previously been inspected.

At 613, control recognizes that there is no match between the networks.

Figure 7:
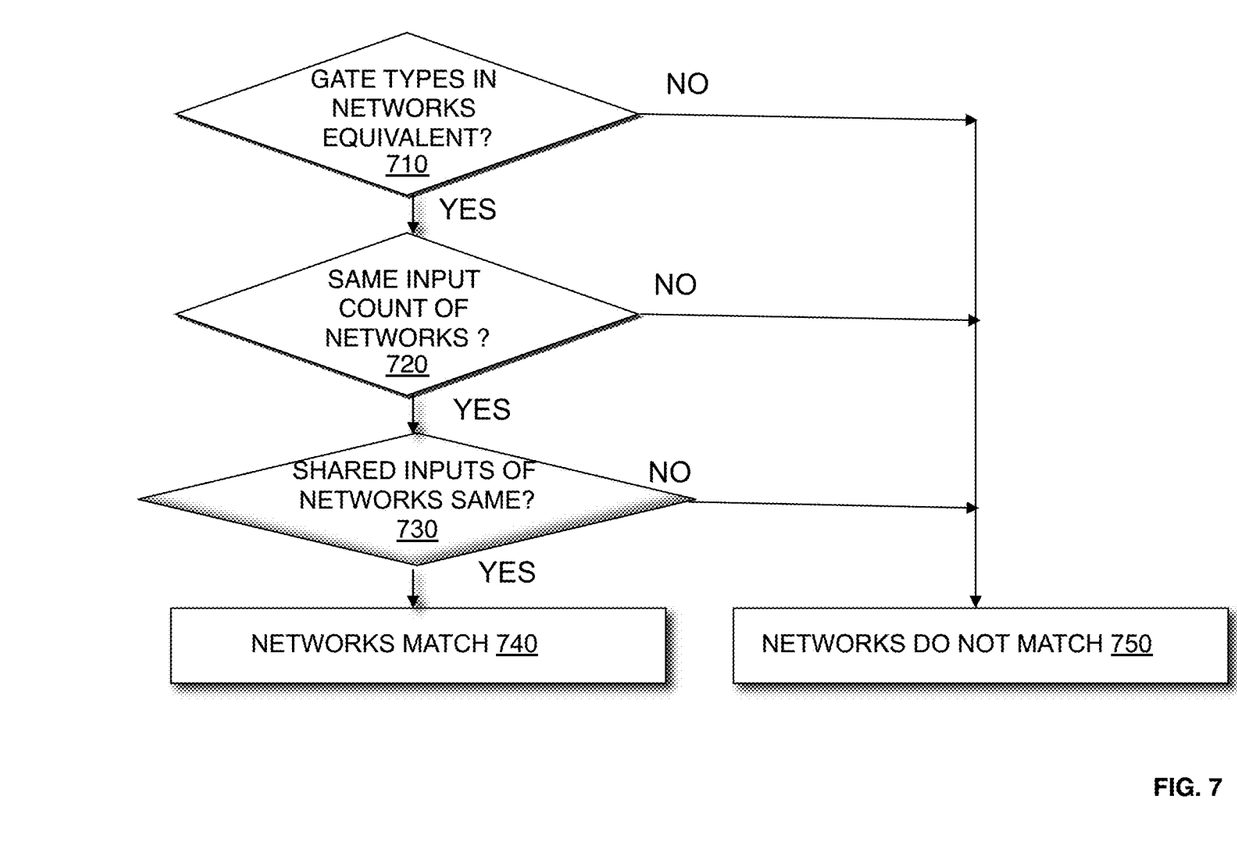
FIG. 7 is a flow chart illustrating a method for performing a conflict check according to an exemplary embodiment of the present disclosure.

FIG. 7 is a flow chart illustrating a method for performing a conflict check according to an exemplary embodiment of the present disclosure. According to an embodiment of the present disclosure, the method described in FIG. 7 may be used to implement procedure 605 shown on FIG. 6. The methodology described in FIG. 6 determines whether there is a match between gates in a network from a library and gates in a network from a netlist of a design as defined by a hypothesis. At 710, the gates in the network are analyzed to determine whether gates from the network from the library and corresponding gates from the network from the netlist of the design are equivalent. If it is determined that the corresponding gates from the networks are equivalent, control proceeds to 720. If it is determined that the corresponding gates from the networks are not equivalent, control proceeds to 750.

At 720, an input count to the networks is analyzed to determine whether an input count to the network from the library and an input count to the network from the netlist of the design are the same. If it is determined that the input count to the network from the library and the input count to the network from the netlist of the design are the same, control proceeds to 730. If it is determined that the input count to the network from the library and the input count to the network from the netlist of the design are not the same, control proceeds to 750.

At 730, shared inputs of the networks are analyzed to determine whether shared inputs to the network from the library and shared inputs to the network from the netlist of the design are the same. According to an embodiment of the present disclosure, this may be achieved when for all previous elements of a hypothesis, a number of shared inputs between netlist candidates is determined to be the same as a number of common signals to the network in the library. If it is determined that the shared inputs to the network from the library and the shared inputs to the network from the netlist of the design are the same, control proceeds to 740. If it is determined that the shared inputs to the network from the library and the shared input to the network from the netlist of the design are not the same, control proceeds to 750.

At 740, it is determined that the networks match and there is no conflict.

At 750 it is determined that the networks do not match and that there is a conflict.

FIGS. 1-2, and 4-7 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 8:
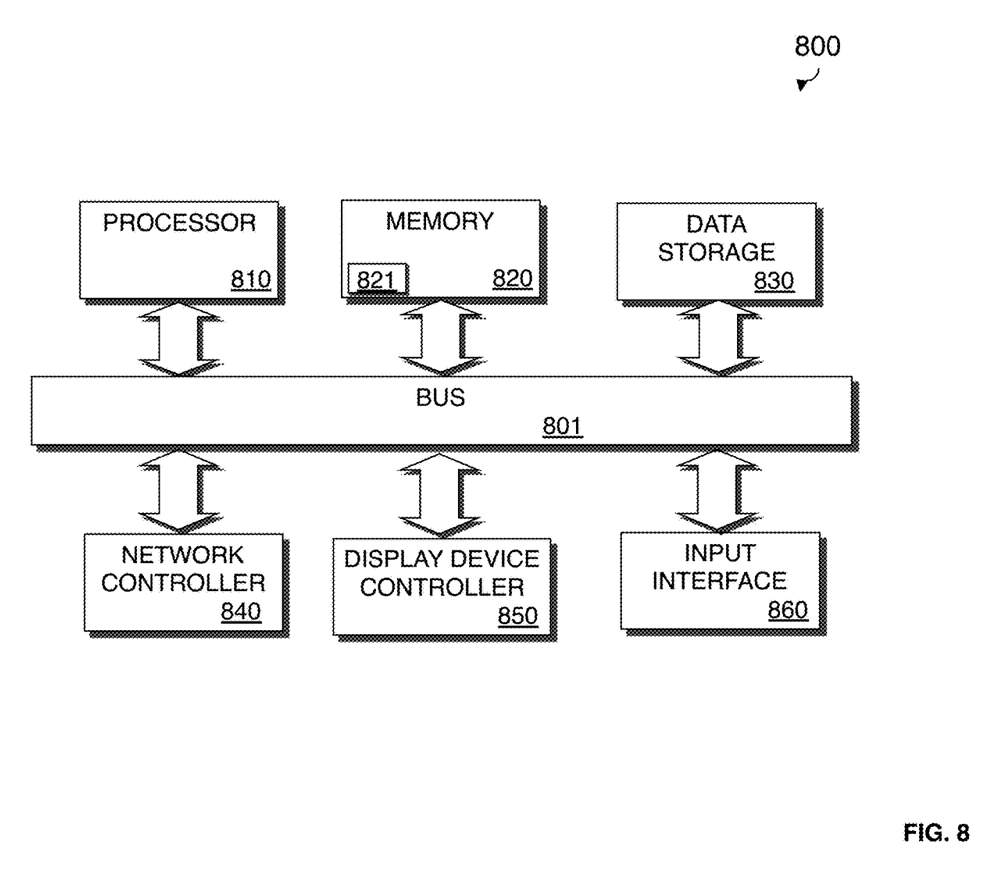
FIG. 8 illustrates a block diagram of a computer system implementing a system designer according to an exemplary embodiment of the present disclosure.

FIG. 8 is a block diagram of an exemplary computer system 800 in which an example embodiment of the present disclosure resides. The computer system 800 includes a processor 810 that process data signals. The processor 810 is coupled to a bus 801 or other switch fabric that transmits data signals between processor 810 and other components in the computer system 800. The computer system 800 includes a memory 820. The memory 820 may store instructions and code represented by data signals that may be executed by the processor 810. A data storage device 830 is also coupled to the bus 801.

A network controller 840 is coupled to the bus 801. The network controller 840 may link the computer system 800 to a network of computers (not shown) and supports communication among the machines. A display device controller 850 is coupled to the bus 801. The display device controller 850 allows coupling of a display device (not shown) to the computer system 800 and acts as an interface between the display device and the computer system 800. An input interface 860 is coupled to the bus 801. The input interface 860 allows coupling of an input device (not shown) to the computer system 800 and transmits data signals from the input device to the computer system 800.

A system designer 821 may reside in the memory 820 and be executed by the processor 810. The system designer 821 may operate to perform synthesis, placement, routing, and timing analysis on a design for the system. According to an embodiment of the present identification and replacement is performed on a design for the system during synthesis. The system designer maintains a library of pairs that include XOR networks and pre-computed factored versions of the XOR networks. During identification and replacement, a design is analyzed to identify un-optimized versions of networks. This may be achieved by finding an un-optimized version of a network in the design that matches a network stored in the library. Identified un-optimized versions of the network that include the XOR network are replaced with pre-computed factored versions of the XOR networks, improving the design.

Figure 9:
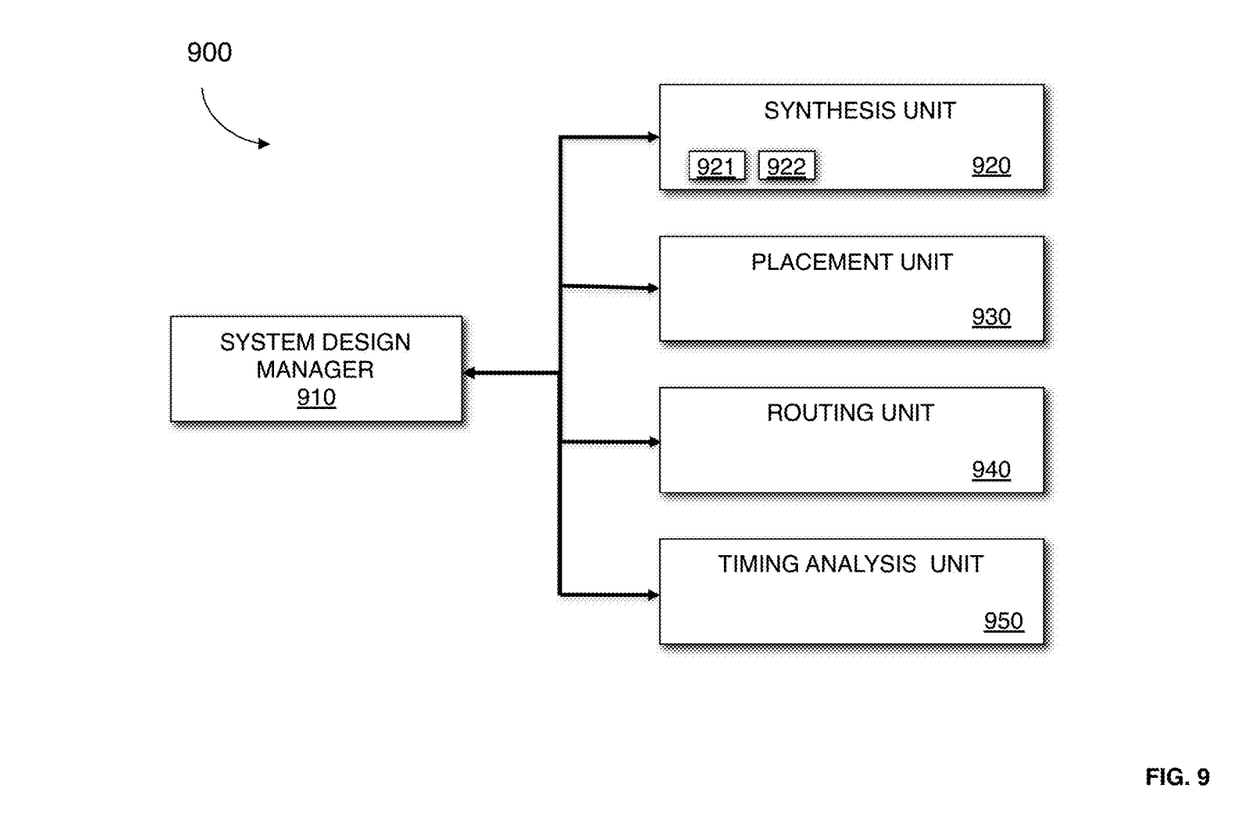
FIG. 9 is a block diagram of a system designer according to an exemplary embodiment of the present disclosure.

FIG. 9 illustrates a system designer 900 according to an embodiment of the present disclosure. The system designer 900 may be an EDA tool for designing a system on a target device such as an FPGA, structured application-specific integrated circuit (ASIC), ASIC, or other circuitry. FIG. 9 illustrates modules implementing an embodiment of the system designer 900. According to one embodiment, the modules represent software modules and system design may be performed by a computer system such as the one illustrated in FIG. 8 executing sequences of instructions represented by the modules shown in FIG. 9. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software. The system designer 900 includes a system designer manager 910. The system designer manager 910 is connected to and transmits data between the components of the system designer 900.

The system designer 900 includes a synthesis unit 920. The synthesis unit 920 takes a conceptual HDL design definition and generates an optimized logical representation of the system. The optimized logical representation of the system generated by the synthesis unit 920 may include a representation that has a reduced number of functional blocks and registers, such as logic gates and logic elements, required for the system. Alternatively, the optimized logical representation of the system generated by the synthesis unit 920 may include a representation that has a reduced depth of logic and that generates a lower signal propagation delay.

The synthesis unit 920 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (JO) elements or other components.

The synthesis unit 920 includes a library 921. The library 921 includes a plurality of network-preferred network pairs. According to an embodiment of the present disclosure, the network-preferred network pairs may be XOR network-preferred XOR network pairs. The preferred XOR networks may be generated by performing factoring of the XOR networks prior to performing synthesis. A preferred XOR network may be preferred over a regular XOR network because it may be implemented with fewer components on the target device, may be implemented with fewer wires on the target device, may require less power to operate, and/or may operate at higher speed than the regular XOR network in the design.

The synthesis unit 920 includes an identification and replacement unit 922. The identification and replacement unit 922 identifies networks in a design for a system that matches networks from the library, and replaces the networks in the design for the system with a preferred network from the library. It should be appreciated that the synthesis unit 920 may perform the procedures described with reference to FIGS. 2, and 4-6, and that the identification and replacement unit 922 may perform the procedures described with reference to FIGS. 4-6.

The system designer 900 includes a placement unit 930 that processes the optimized technology-mapped netlist to produce a placement for each of the functional blocks. The placement identifies which components or areas on the target device are to be used for specific functional blocks and registers.

The system designer 900 includes a routing unit 940 that determines the routing resources on the target device to use to provide interconnection between the components implementing functional blocks and registers of the logic design.

The system designer 900 includes a timing analysis unit 950 that performs timing analysis to determine whether timing constraints of the system are satisfied.

The system designer manager 910 may perform an assembly procedure that creates a data file that includes the design of the system. The data file may be a bit stream that may be used to program the target device. The assembly procedure may output the data file so that the data file may be stored or alternatively transmitted to a separate machine used to program the target device. It should be appreciated that the assembly procedure may also output the design of the system in other forms such as on a display device or other medium.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 10:
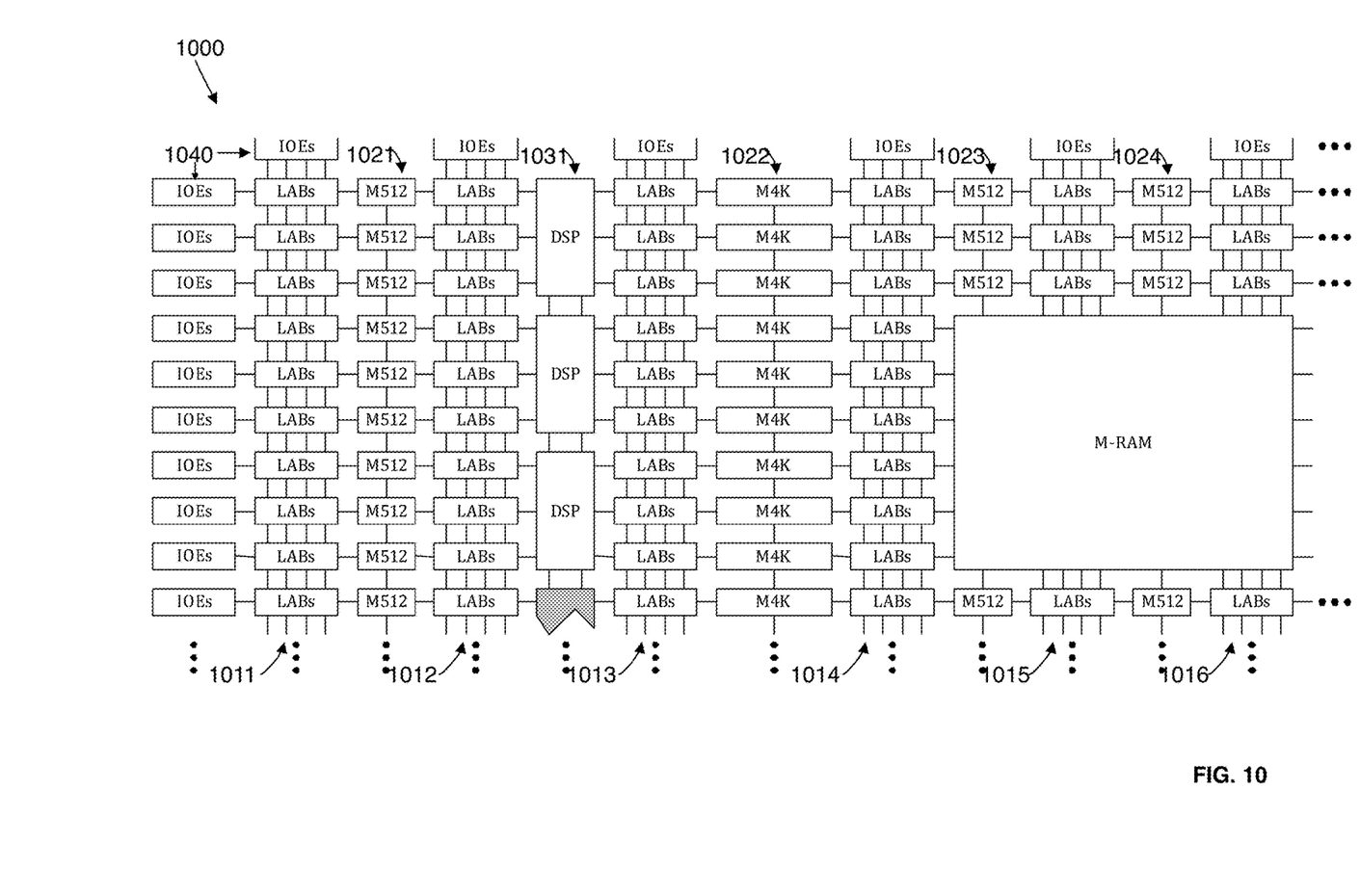
FIG. 10 illustrates an exemplary target device according to an exemplary embodiment of the present disclosure.

FIG. 10 illustrates a device 1000 that may be used to implement a target device according to an embodiment of the present disclosure. The device may be implemented on a die, as discussed above. The device 1000 is a field programmable gate array (FPGA) that includes a plurality of logic-array blocks (LABs). According to an embodiment of the present disclosure, the device 1000 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers.

According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation. LABs are grouped into rows and columns across the device 1000. Columns of LABs are shown as 1011-1016. It should be appreciated that the logic block may include additional or alternate components.

The device 1000 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1000. Columns of memory blocks are shown as 1021-1024.

The device 1000 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1000 and are shown as 1031.

The device 1000 includes a plurality of input/output elements (IOEs) 1040. Each IOE feeds an IO pin (not shown) on the device 1000. The IOEs 1040 are located at the end of LAB rows and columns around the periphery of the device 1000. Each IOE may include a bidirectional IO buffer and a plurality of registers for registering input, output, and output-enable signals.

The device 1000 may include routing resources such as LAB local interconnect lines, row interconnect lines ("H-type wires"), and column interconnect lines ("V-type wires") (not shown) to route signals between components on the target device.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed:

1. A method for designing a system on a target device, comprising:

identifying an exclusive-OR (XOR) network in a design for the system that matches an XOR network in a library having a corresponding preferred XOR network;

presenting a user with a plurality of preferred XOR networks that is available to be used to replace the XOR network identified, and objectives achieved by the preferred XOR networks;

replacing the XOR network identified in the design with one of the preferred XOR networks in the library in response to an objective identified by the user from the objectives presented, wherein the identifying and replacing is performed during synthesis prior to placing and routing the system on the target device;

generating a program file that includes the design; and programming the target device with the program file to transform programmable resources to implement the design, wherein the target device has been implemented on a die.

2. The method of claim 1, wherein the preferred XOR network in the library is implemented with fewer components on the target device than the XOR network in the design.

3. The method of claim 1, wherein the preferred XOR network in the library is implemented with fewer wires on the target device than the XOR network in the design.

4. The method of claim 1, wherein the preferred XOR network in the library re-uses a greater number of common sub-expressions than the XOR network in the design.

5. The method of claim 1, wherein the preferred XOR network in the library requires less power and operates at higher speed and is implemented with fewer wires on the target device than the XOR network in the design.

6. The method of claim 1, wherein identifying the XOR network that matches the XOR network in the library comprises:

comparing an input count of the XOR network in the design with an input count of the XOR network in the library; and comparing shared inputs of the XOR network in the design with shared inputs of the XOR network in the library.

7. The method of claim 1 further comprising:

generating a file with matching port names; and performing a solution demonstrating equivalence of the preferred XOR network.

8. The method of claim 1 further comprising notifying a designer of replacement options.

9. The method of claim 1 further comprising identifying another XOR network in the design for the system that matches another XOR network in the library.

10. The method of claim 1, wherein the preferred XOR network is generated prior to performing synthesis.

11. The method of claim 1, wherein the preferred XOR network in the library is selected from a plurality of preferred XOR networks in the library in response to an objective provided by a user.

12. The method of claim 1, wherein the identifying, presenting, and replacing is performed prior to technology mapping.

13. A non-transitory computer readable medium including a sequence of instructions stored thereon for causing a computer to execute a method for designing a system on a target device, comprising:

identifying a network in a design for the system that matches a network in a library, wherein the network corresponds to a plurality of preferred networks;

notifying a user that a preferred network is available to be used in placed of the network in the design;

presenting the user with the plurality of preferred networks that are available to be used to replace the network identified, and objectives achieved by the preferred networks;

replacing the network identified with one of the preferred networks in the design in response to an objective identified by the user from the objectives presented to the user;

generating a program file with the design; and programming the target device with the program file to transform programmable resources to implement the design, wherein the target device has been implemented on a die.

14. The non-transitory computer readable medium of claim 13, wherein the network in the design includes a plurality of components performing an exclusive-OR (XOR) function.

15. The non-transitory computer readable medium of claim 13, wherein notifying the user comprises:

generating a file with matching port names; and demonstrating equivalence of the preferred network.

16. The non-transitory computer readable medium of claim 13, wherein the method further comprises replacing the network in the design with the preferred network upon receiving authorization from the user.

17. The non-transitory computer readable medium of claim 13, wherein identifying the network in the design that matches the network in the library comprises:

comparing an input count of the network in the design with an input count of the network in the library; and comparing shared inputs of the network in the design with the shared inputs of the network in the library.

18. The non-transitory computer readable medium of claim 13, wherein the method further comprises identifying another network in the design for the system that matches another network in the library.

19. The non-transitory computer readable medium of claim 13, wherein the identifying and notifying is performed during synthesis.

20. The non-transitory computer readable medium of claim 13, wherein the preferred network is generated prior to performing synthesis.

21. The non-transitory computer readable medium of claim 13, wherein the identifying, notifying, presenting, and replacing is performed prior to technology mapping.

22. A system designer, comprising:

a library that includes a plurality of exclusive-OR (XOR) network-preferred XOR network pairs;

an identification and replacement unit that identifies an XOR network in a design for a system that matches an XOR network from the library, presents a user with a plurality of preferred networks that is available to be used to replace the network identified, and objectives achieved by the preferred networks, and replaces the identified XOR network in the design for the system with one of the preferred networks from the library that corresponds to the XOR network in response to an objective identified by the user from the objectives presented, wherein the identifying and replacing is performed during synthesis prior to technology mapping; and a system designer manager that generates a program file with the design, and that programs a target device with the program file to transform programmable resources to implement the design, wherein the target device has been implemented on a die.

23. The system designer of claim 22, wherein the XOR network-preferred XOR network pairs are generated and stored in the library prior to performing synthesis of the design.

24. The system designer of claim 22, wherein the identification and replacement unit identifies the XOR network in the design for the system that matches the XOR network from the library by comparing an input count of the XOR network in the design with an input count of the XOR network in the library, and comparing shared inputs of the XOR network in the design with shared inputs of the XOR network in the library.

* * * * *